(12) United States Patent
Gache et al.

(10) Patent No.: US 11,340,450 B2
(45) Date of Patent: May 24, 2022

(54) DEVICE FOR GENERATING THREE-DIMENSIONAL IMAGES AND ASSOCIATED HEADS-UP DISPLAY

(71) Applicant: VALEO COMFORT AND DRIVING ASSISTANCE, Créteil (FR)

(72) Inventors: Stéphane Gache, Créteil (FR); Bruno Albesa, Créteil (FR); Gérard Guenin, Créteil (FR); Alexandre Camenen, Créteil (FR); Jean-David Lafferayrie, Créteil (FR); Pierre Mermillod, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 233 days.

(21) Appl. No.: 16/323,108

(22) PCT Filed: Aug. 3, 2017

(86) PCT No.: PCT/EP2017/069751
§ 371 (c)(1),
(2) Date: Apr. 18, 2019

(87) PCT Pub. No.: WO2018/024863
PCT Pub. Date: Feb. 8, 2018

(65) Prior Publication Data
US 2019/0243152 A1    Aug. 8, 2019

(30) Foreign Application Priority Data

Aug. 3, 2016   (FR) ...................................... 16/01196

(51) Int. Cl.
*G02B 27/01* (2006.01)
*G02B 27/00* (2006.01)
(Continued)

(52) U.S. Cl.
CPC ......... *G02B 27/0081* (2013.01); *G02B 3/005* (2013.01); *G02B 5/0215* (2013.01);
(Continued)

(58) Field of Classification Search
CPC ........ G02B 30/27; G02B 30/26; G02B 3/005; G02B 27/0081; G02B 27/0101;
(Continued)

(56) References Cited

U.S. PATENT DOCUMENTS 8,586,285 B2 * 11/2013 Gates ............... B29D 11/00365
430/321
9,874,761 B2 * 1/2018 Van Putten ............ G02B 30/27
(Continued)

FOREIGN PATENT DOCUMENTS

| CN | 103513438 B | 11/2015 |
|---|---|---|
| JP | 2013068886 A | 4/2013 |
| JP | 2013235224 A | 11/2013 |

OTHER PUBLICATIONS

International Search Report and Written Opinion Issued in Corresponding PCT Application No. PCT/WP2017/069751, dated Sep. 5, 2017 (11 pages with English Translation of International Search Report).

*Primary Examiner* — Audrey Y Chang
(74) *Attorney, Agent, or Firm* — Osha Bergman Watanabe & Burton LLP

(57) ABSTRACT

The invention relates to a device (20) for generating images, comprising: —a diffuser (25), and—a scanning unit (22) designed to generate a light beam scanning a face of said diffuser. According to the invention, the image generating device also comprises an autostereoscopic filter (26).

8 Claims, 1 Drawing Sheet

(51) Int. Cl.
*G02B 5/02* (2006.01)
*G02B 3/00* (2006.01)
*H04N 13/305* (2018.01)
*H04N 13/365* (2018.01)
*G02B 30/27* (2020.01)
*G02B 26/10* (2006.01)

(52) U.S. Cl.
CPC ....... *G02B 5/0278* (2013.01); *G02B 27/0101* (2013.01); *G02B 30/27* (2020.01); *H04N 13/305* (2018.05); *H04N 13/365* (2018.05); *G02B 26/105* (2013.01); *G02B 2027/0134* (2013.01)

(58) Field of Classification Search
CPC .. G02B 5/0278; G02B 5/0215; G02B 26/105; G02B 2027/0134; H04N 13/305; H04N 13/365; H04N 13/398
USPC .............................. 359/463, 630, 13; 348/51
See application file for complete search history.

(56) References Cited

U.S. PATENT DOCUMENTS

| | | | |
|---|---|---|---|
| 2007/0201133 A1* | 8/2007 | Cossairt | G02B 30/27 359/463 |
| 2011/0080472 A1* | 4/2011 | Gagneraud | H04N 13/398 348/51 |
| 2012/0051044 A1* | 3/2012 | Akiyama | G03B 21/2013 362/233 |
| 2013/0057954 A1 | 3/2013 | Nakahara et al. | |
| 2017/0351091 A1* | 12/2017 | Nakano | G02B 27/01 |

\* cited by examiner

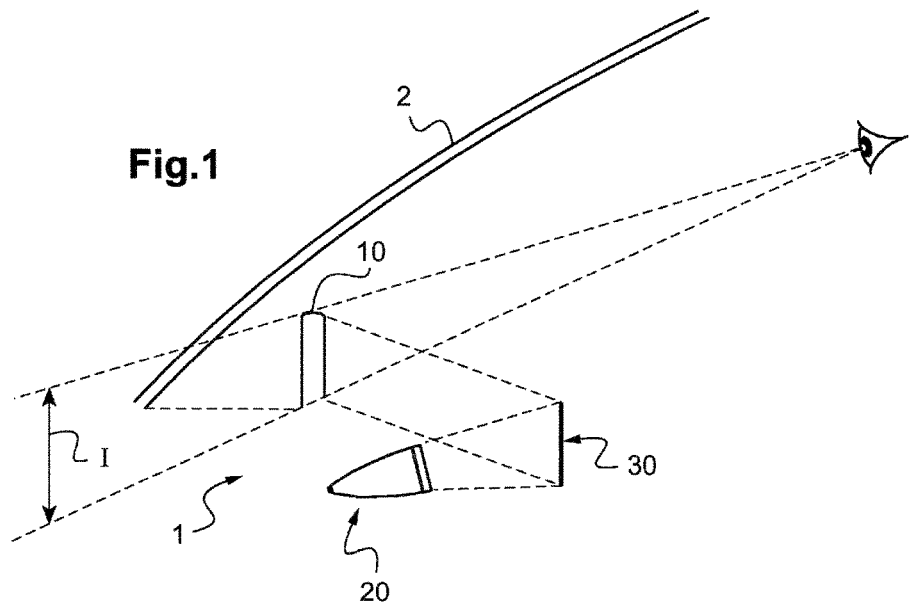
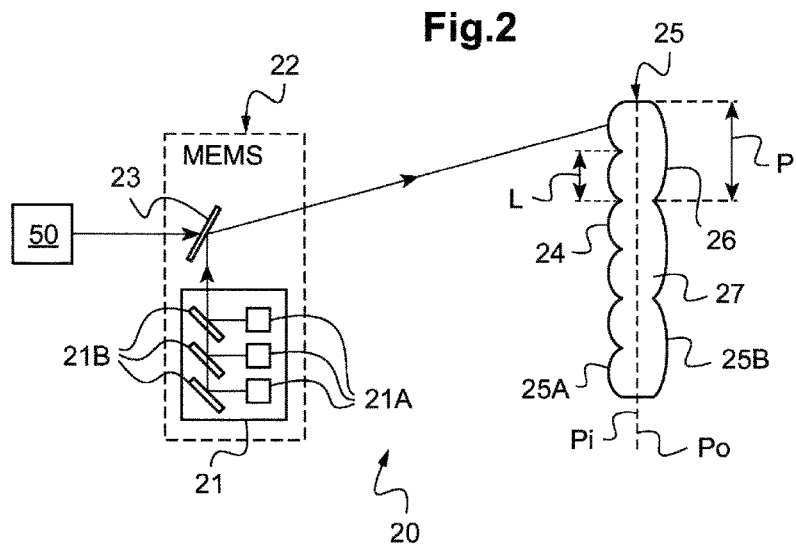

DEVICE FOR GENERATING THREE-DIMENSIONAL IMAGES AND ASSOCIATED HEADS-UP DISPLAY

TECHNICAL FIELD TO WHICH THE INVENTION RELATES

The present invention generally relates to the field of head-up displays, in particular for motor vehicles.

It more particularly relates to the image-generating devices of such head-up displays.

TECHNOLOGICAL BACKGROUND

The principle of vehicle head-up displays is to project images, in particular images that are useful for driving, directly into the field of vision of a driver.

To do this, head-up displays in general comprise an image-generating device suitable for generating images and a device for projecting the generated images, which is suitable for transmitting these images to a partially transparent plate placed in the field of vision of the driver.

At the present time, most head-up displays generate two-dimensional (2D) images in the field of vision of the driver.

A system has moreover been developed that allows two images to be displayed in two different planes, in order that the driver may perceive information as though it were displayed in two planes, one nearer to him and the other further away.

This system in particular uses two displays that are associated with two prisms that allow two separate images to be displayed at different distances from the driver, one of which is visible by the right eye of the driver and the other of which is visible by the left eye of the driver.

This system has two major drawbacks because of the plurality of elements used: its cost is high and its bulk is considerable.

SUBJECT OF THE INVENTION

In this context, the present invention proposes a device for generating three-dimensional images.

More particularly, according to the invention an image-generating device comprising a diffuser and a scanning unit that is designed to generate a light beam that scans one face of said diffuser is proposed, said image-generating device furthermore comprising an autostereoscopic filter.

The autostereoscopic filter of the image-generating device allows three-dimensional (3D) images to be generated.

In the generating device according to the invention, said autostereoscopic filter may be integrated into the diffuser so that said diffuser and said autostereoscopic filter form a single part.

Advantageously, the image-generating device is then small in bulk. Furthermore, the mechanical design of said image-generating device is simplified.

The following are other nonlimiting and advantageous features of the image-generating device according to the invention:

the diffuser includes a substrate having two opposite main faces, a scattering structure placed on that main face of the substrate which is scanned by the light beam, and, said autostereoscopic filter placed on the main face opposite to that scanned by the light beam;

the scattering structure comprises a matrix array of microlenses;

the diameter of each microlens of the scattering structure is comprised between 80 and 120 microns;

said microlenses are arranged in the matrix array in the form of rows that are parallel to one another and of columns that are parallel to one another (so that said light beam that scans the diffuser generates in an image focal plane of said matrix array of microlenses a set of pixels forming an intermediate image);

said image-generating unit furthermore comprises a control module suitable for synchronizing the scan of the light beam over the matrix array of microlenses;

said autostereoscopic filter comprises a lenticular array including an arrangement of cylindrical lenses;

the lenticular array has an object focal plane that is coincident with an image focal plane of the matrix array of microlenses;

said cylindrical lenses are arranged so as to generate, as output from said image-generating device, at least one first two-dimensional image that is intended to be observed from a first viewpoint, and one second two-dimensional image that is intended to be observed from a second viewpoint;

the pitch of each cylindrical lens of the autostereoscopic filter is equal to the width of two pixels of the intermediate image;

the scanning unit comprises a module for forming the light beam and a movable mirror that is suitable for generating the scan of said light beam over the diffuser;

the laser beam generated by the scanning unit is focused on the diffuser with a diameter comprised between 90 and 110 microns;

the diffuser is made from a transparent material;

the autostereoscopic filter and the scattering structure are molded into a single part to form the diffuser.

The invention also proposes a head-up display comprising an image-generating device according to the invention and an image-projecting device suitable for transmitting in the direction of a partially transparent plate (or partially reflective plate) the images generated by the image-generating device.

DETAILED DESCRIPTION OF ONE EMBODIMENT

The following description, which is given with reference to the appended drawings, which are given by way of nonlimiting example, will allow of what the invention consists and how it may be carried out to be clearly understood.

In the appended drawings:

FIG. 1 is a schematic representation of a head-up display according to the invention in position in the vehicle;

FIG. 2 is an image-forming device according to the invention usable in the head-up display of FIG. 1.

FIG. 1 shows the main elements of a head-up display 1 with which a vehicle, for example a motor vehicle, is intended to be equipped.

Such a display 1 is suitable for creating a virtual image I in the field of view of a driver of the vehicle, so that the driver may see this virtual image I and any information that it contains without having to divert his gaze.

To this end, the display 1 comprises a partially transparent plate 10 placed in the field of vision of the driver (see FIG. 1), and an image-generating device 20 that is suitable for generating images and an image-projecting device 30 that is suitable for transmitting in the direction of said partially transparent plate 10 the images generated by the image-generating unit 20.

More precisely, the partially transparent plate 10 is here a combiner 10, i.e. a partially transparent plate dedicated to the head-up display 1. In practice, the partially transparent plate is also what is referred to as a semitransparent plate.

Such a combiner 10 is here placed between the windshield 2 of the vehicle and the eyes of the driver.

As a variant, the partially transparent plate may be the windshield of the vehicle. In other words, in this variant, it is the windshield of the vehicle that has the function of partially transparent plate for the head-up display.

Moreover, here, the image-projecting device 30 comprises a folding mirror arranged so as to reflect the images generated by the image-generating device 20 in the direction of the partially transparent plate 10. Here, said folding mirror is a planar mirror.

As a variant, the image-projecting device could comprise a plurality of mirrors and/or other optical elements such as a lens for example.

The head-up display 1 according to the invention is furthermore designed such that the virtual images I projected into the field of vision of the driver are three-dimensional images. These images are more precisely intended to be seen in three dimensions by the driver, without requiring for him to wear stereoscopic glasses (i.e. what are better known as "3D glasses").

In practice, the display 1 creates such three-dimensional virtual images I by virtue of the image-generating device 20 schematically shown in FIG. 2.

This image-generating device 20 comprises a scanning unit 22 that generates a light beam of variable direction, a diffuser 25 an entrance main face 25A of which is scanned by said light beam, and an autostereoscopic filter 26.

The scanning unit 22 comprises a beam-forming module 21 and a movable mirror 23, which for example takes the form of a microelectromechanical system (or MEMS).

The beam-forming module 21 typically comprises three monochromatic light sources 21A, such as laser sources, the respective (monochromatic) light beams of which are combined, for example using dichroic mirrors 21B, in order to form the polychromatic (here laser) light beam emitted as output from the beam-forming module 21.

This light beam generated by the beam-forming module 21 is directed towards the movable mirror 23, the orientation of which is controlled by a control module 50 so that the light beam reflected by the movable mirror 23 scans the entrance main face 25A of the diffuser 25.

In practice, the entrance main face 25A of the diffuser 25 is the face of the diffuser 25 that receives the light beam incident on said diffuser 25.

The light beam generated by the beam-forming module 21 is focused (or collimated) on this entrance main face 25A of the diffuser 25.

The light beam then has on said entrance main face 25A a diameter comprised between 90 microns and 110 microns.

The control module 50 of the image-generating unit 20 for example comprises a processor and a memory unit such as a rewritable nonvolatile memory or a hard disk.

The memory unit in particular stores a software application, consisting of at least one computer program comprising instructions that are executable by the processor.

The control unit 50 is thus suitable for controlling the movable mirror 23 so that it directs the light beam toward a precise zone of the entrance main face 25A of the diffuser 25.

The diffuser 25 here includes a substrate 27 having two opposite main faces and a scattering structure 24 that is placed on the side of one of the main faces of said substrate 27.

More precisely, the scattering structure 24 is placed on the side of that main face of the substrate 27 which is scanned by the light beam.

In practice, the scattering structure 24 is here placed on that main face of the substrate which is scanned by the light beam.

Thus, the scattering structure 24 forms an integral portion of the substrate 27 and forms the entrance main face 25A of said diffuser 25. In other words, here, the substrate 27 and the scattering structure 24 form a single part, called the diffuser 25.

The autostereoscopic filter 26 is placed on the side of the main face of the substrate 27 through which the light beam emerges after having passed through the diffuser 25.

In practice, the autostereoscopic filter 26 is here placed on the main face of the substrate 27 through which the light beam emerges after having passed through said diffuser 25.

Thus, said autostereoscopic filter 26 is here integrated into the diffuser 25 and forms an exit main face 25B of said diffuser 25, said exit main face 25B being the face through which the light beam exits from the diffuser 25 after having passed through the diffuser 25.

In other words, the autostereoscopic filter 26 and the diffuser 25 form a single part.

Thus, the scattering structure 24, the substrate 27 and the autostereoscopic filter 26 together form a single part referred to as the autostereoscopic-effect diffuser 25.

In practice, the autostereoscopic filter 26, the scattering structure 24 and the substrate 27 are molded into a single part in order to form the autostereoscopic-effect diffuser 25.

The autostereoscopic-effect diffuser 25 is made from a transparent (or translucent) material and for example made of glass or of polycarbonate.

The scattering structure 24 (or EPE for exit pupil expander) has the effect of increasing the size of the exit pupil of the diffuser 25. In other words, via an effect that causes redistribution or scatter of the beams in various directions, the scattering structure 24 opens the light beam that emerges from the diffuser 25.

In other words, the expansion of the light beam creates a diffusion cone at the exit from the diffuser 25 so that the images output from the diffuser 25 may be seen in a plurality of directions.

Thus, the scattering structure 24 makes using the display 1 comfortable for the driver.

The scattering structure 24 also has the effect of creating a real image of the incident (laser) light beam, in the substrate 27 of the diffuser 25. This real image of the beam then forms one pixel of an intermediate image of the image-generating device.

Such a scattering structure 24 is for example formed of an array.

In practice, the scattering structure 24 here comprises a matrix array of microlenses (or MLA for multi-lens array).

Here, the microlenses are arranged in the matrix array in the form of rows that are parallel to one another and of columns that are parallel to one another.

The aperture diameter of each microlens of the matrix array is comprised between 80 microns and 120 microns ($\mu m$). It is for example 100 $\mu m$.

Thus, advantageously, the aperture diameter of each microlens is adapted to the diameter of the laser light beam focused on the entrance main face 25A of the diffuser 25.

Furthermore, all the microlenses of the matrix array preferably have the same, relatively short, focal length, which is equal to the focal length of the matrix array of microlenses. In practice, the focal length of each microlens is comprised between 0.25 mm and 0.4 mm.

The light beam that scans the diffuser 25 then generates, in an image focal plane Pi of said matrix array of microlenses, a set of pixels, this set of pixels forming said intermediate image.

The pixels form rows that are parallel to one another and columns that are parallel to one another, and have the same organization as the organization of the microlenses in the matrix array.

In practice, it is here considered that the rows of pixels are horizontal, namely perpendicular to the plane of FIG. 2, and that the columns are vertical in the plane in FIG. 2.

Provision is here made for the image focal plane Pi of the matrix array of microlenses to be comprised in the interior of the substrate 27 of the diffuser 25.

Moreover, the curvature of the microlenses has a direct effect on the size of the diffusion cone output from the diffuser 25. In other words, the curvature of each microlens is chosen so as to obtain the diffusion cone that it is desired to output from the diffuser 25.

Here, preferably, the autostereoscopic filter 26 comprises an array of convergent lenses.

By virtue of the autostereoscopic filter 26 of the image-generating module 20, the display 1 is suitable for simultaneously displaying in the field of vision of the driver two distinct two-dimensional images, each of these two-dimensional images being able to be observed individually from one separate viewpoint.

In practice, the autostereoscopic filter 26 generates a first two-dimensional image that is intended to be seen by the driver from a first viewpoint, and a second two-dimensional image that is intended to be seen by the driver from a second viewpoint.

In other words, each two-dimensional image generated in the field of vision of the driver may be seen from one specific angle, the specific angle of observation of the first two-dimensional image being different from the specific angle of observation of the second two-dimensional image.

In practice, the observation angles, or viewpoints, of the driver correspond to what his right eye, on the one hand, and his left eye, on the other hand, are liable to observe independently of each other.

The driver may thus simultaneously observe the first two-dimensional image with his right eye and the second two-dimensional image with his left eye, and his brain then fictitiously reconstructs a single three-dimensional image from the two observed two-dimensional images.

The autostereoscopic filter 26 comprises to this end a lenticular array including an arrangement of convergent cylindrical lenses.

In practice, each cylindrical lens is a lens that is profiled along a main axis, here perpendicular to the plane of FIG. 2, and of convex transverse cross section.

As FIG. 2 shows, the cylindrical lenses are arranged one above the other so that the main axes of extension of said lenses are parallel to one another. Here, these axes are horizontal with respect to the direction of FIG. 2, i.e. perpendicular to the plane of FIG. 2.

In other words, the axes of extension of the cylindrical lenses are here parallel to the rows formed by the pixels of the intermediate image and perpendicular to the columns formed by these pixels.

As a variant, the cylindrical lenses could be arranged beside one another so that each axis of extension of each lens is vertical in the plane of FIG. 2.

Furthermore, the curvature of each cylindrical lens is chosen so as to obtain the desired final stereoscopic effect.

All the cylindrical lenses of the lenticular array here have the same, relatively short, focal length, which is equal to the focal length of the lenticular array.

The image focal plane Pi of the matrix array of microlenses forming the scattering structure 24 is coincident with the object focal plane Po of the lenticular array forming the autostereoscopic filter 26.

The thickness of the diffuser 25, namely the distance separating the scattering structure 24 and the autostereoscopic filter 26 orthogonally, is chosen depending on said respective focal lengths of the matrix array of microlenses and of the lenticular array. In other words, the thickness of the diffuser 25 is such that the intermediate image is formed in the interior of said diffuser 25.

The thickness of the diffuser 25 is also chosen so as to obtain the desired final stereoscopic effect.

Since the image focal plane Pi of the matrix array of microlenses and the object focal plane Po of the lenticular array are coincident, the cylindrical lenses magnify the pixels of the intermediate image comprised in the image focal plane of the matrix array of microlenses and redirect these pixels to infinity.

Here, the magnification of the pixels is vertical on the whole with respect to the direction of FIG. 2, in so far as the cylindrical lenses are arranged with their respective axis extending horizontally on the whole (perpendicular to the plane of FIG. 2).

The cylindrical lenses are arranged in the lenticular array so as to generate, as output from said image-generating device 20, at least the first two-dimensional image intended to be seen from the first viewpoint (one of the eyes of the driver) and the second two-dimensional image intended to be seen from the second viewpoint (the other eye of the driver).

In practice, in the case of an image-generating unit 20 that generates exactly two two-dimensional images (case of FIG. 2), the pitch p of each cylindrical lens of the autostereoscopic filter 26 is equal to the vertical width L of two pixels of the intermediate image. The pitch p of the cylindrical lens is here understood to mean the orthogonal distance to the axis of extension of said cylindrical lens, on the exit main face 25B of the diffuser 25. The width L of the pixel is the dimension of the pixel in the same direction as the pitch p of the cylindrical lens.

Here, the lenticular array is perfectly aligned with the pixels, so that the axes of extension of each cylindrical lens coincide with the junction of two consecutive rows of pixels.

As a variant, it is envisionable to incline the lenticular array slightly with respect to the pixels, so that the axes of extension of each cylindrical lens, which are always parallel to one another, are slightly inclined with respect to the horizontal rows formed by the pixels. The angle of inclination of the axis of extension of a cylindrical lens with respect to a row of pixels may for example be 18° 43.

Advantageously, this variant allows the two-dimensional images obtained as output from the display 1 to be improved, by breaking structural effects related to the alignment of the pixels.

As has already been said, the lenticular array and the matrix array of microlenses are molded into a single part with the substrate 27 of the diffuser 25. This guarantees a good alignment of the cylindrical lenses with the microlenses, and therefore with the pixels of the intermediate image.

The operation of the image-generating device 20 that has just been described will now be described.

The light beam generated by the beam-forming module 21 is reflected from the movable mirror 23, which is controlled by the control module 50.

By virtue of the control module 50, the light beam incident on the scattering structure 24 of the diffuser 25 is always centered on the microlens that it is illuminating.

The light beam then passes through the microlens and is focused into the image focal plane Pi of this microlens in order to form one pixel of the intermediate image.

The control module 50 also controls each of the monochromatic light sources 21A, in particular the respective intensity of these sources, so as to obtain the luminance and chrominance values desired for the pixel of the intermediate image.

Furthermore, the control module 50 synchronizes the scan of the light beam over the matrix array of microlenses forming the scattering structure 24.

The synchronization here consists in ensuring that the light beam is always centered on one microlens, i.e. that the beam is turned off when it is oriented onto a zone of the entrance main face 25A of the diffuser 25 that is located between two adjacent microlenses.

To do this, the control module 50 in particular sets a speed of movement (for example a speed of rotation) of the movable mirror 23 and a flicker rate (successive turn-on and turn-off) of the light beam.

Thus, the light beam is momentarily turned off during the movement of the movable mirror 23 allowing the beam to be brought from one microlens to the adjacent microlens.

Here, the light beam is moved row by row, so as to scan all of the matrix array of microlenses.

The complete scan of the matrix array of microlenses is carried out in a very brief lapse of time so as to persistently form a set of pixels, this set of pixels forming the intermediate image.

By virtue of the autostereoscopic filter 26, the pixels of the intermediate image are combined together so as to generate the two two-dimensional images, each two-dimensional image being observable by the driver from a separate viewpoint (right eye on the one hand and left eye on the other hand).

These two two-dimensional images issued from the intermediate image are then interpreted by the brain of the driver as being a single three-dimensional image.

The image-generating unit 20 described above and its operating principle are also usable in display screens, in television screens for example.

The invention claimed is:

1. An image-generating device comprising:
    a diffuser that includes:
        a substrate having two opposite main faces, and
        a scattering structure placed on a first face of the substrate that is scanned by a light beam,
    a scanning unit that generates the light beam that scans the first face of said diffuser; and
    an autostereoscopic filter comprising:
        a lenticular array including an arrangement of cylindrical lenses,
        wherein a pitch of each lens of the arrangement of cylindrical lenses is equal to a width of two pixels of an intermediate image,
    wherein a diameter of each lens of the arrangement of cylindrical lenses is between 80 and 120 microns,
    wherein a diameter of the light beam generated by the scanning unit is between 90 and 110 microns, and
    wherein the autostereoscopic filter is placed on a second face of the diffuser such that the autostereoscopic filter is disposed opposite of the scattering structure, and
    wherein the scattering structure comprises a matrix array of microlenses.

2. The device as claimed in claim 1, wherein said autostereoscopic filter is integrated into the diffuser so that said diffuser and said autostereoscopic filter form a single part.

3. The device as claimed in claim 1, wherein said microlenses are arranged in the matrix array in the form of rows that are parallel to one another and of columns that are parallel to one another.

4. The device as claimed in claim 1, furthermore comprising a control module for synchronizing the scan of the light beam over the matrix array of microlenses.

5. The device as claimed in claim 1, wherein the lenticular array has an object focal plane that is coincident with an image focal plane of the matrix array of microlenses.

6. The device as claimed in claim 1, wherein said cylindrical lenses are arranged so as to generate, as output from said image-generating device, at least one first two-dimensional image to be observed from a first viewpoint, and one second two-dimensional image to be observed from a second viewpoint.

7. The device as claimed in claim 1, wherein the scanning unit comprises a module for forming the light beam and a movable mirror for generating the scan of said light beam over the diffuser.

8. A head-up display comprising:
    an image-generating device as claimed in claim 1; and
    an image-projecting device for transmitting in the direction of a partially transparent plate the images generated by the image-generating device.

* * * * *